UNITED STATES PATENT OFFICE 2,505,562

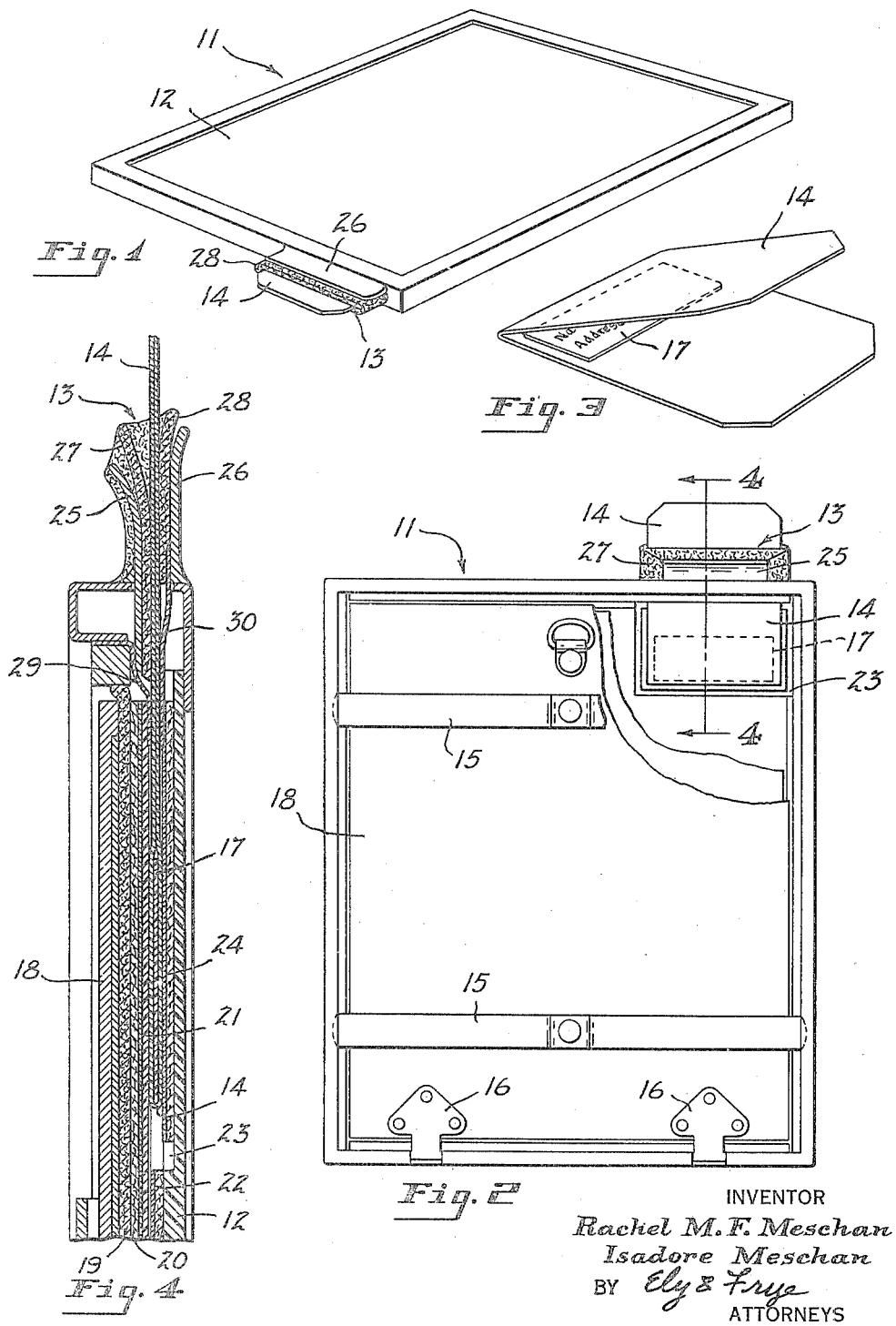

SLIT IDENTIFICATION X-RAY CASSETTE

Rachel M. F. Meschan and Isadore Meschan, North Little Rock, Ark.; said Isadore Meschan assignor to said Rachel M. F. Meschan Application December 6, 1948, Serial No. 63,734

6 Claims. (Cl. 250—67)

The present invention relates to improvements in X-ray cassettes for taking and identifying X-ray films and more particularly to an X-ray cassette which is constructed in such manner that X-ray films may be simply and effectively identified, with the patient's name and all pertinent data, simultaneously with the X-ray exposure.

In the past, various means for identifying X-ray films simultaneously with the X-ray exposure have been used but they are objectionable either because the identification is not sufficiently reliable, as when lead numbers or letters are placed on the cassette, or because the apparatus is complex, cumbersome and expensive. Reliable identification simultaneously with the X-ray exposure is particularly important from the medico-legal aspect.

According to the present invention, a simple, reliable and effective means is provided for identifying X-rays by having the information required for identification photographed directly on the film at the time the exposure is made.

It is therefore an object of the present invention to provide a cassette which is simple in construction and which enables an identification slip to be easily inserted at the edge of the cassette so that it will overlie the X-ray film and will be in the path of the rays as they travel to the film.

The invention will be described in detail with reference to the accompanying drawings which form a part of this specification.

In the drawings:

Figure 1 is a perspective view of a cassette embodying the present invention;

Figure 2 is a plan view of the back of a cassette, with a portion broken away to better illustrate the invention;

Figure 3 is a perspective view of an identification holder for use with a cassette embodying the present invention; and Figure 4 is a partial cross-sectional view of the cassette taken on line 4—4 of Figure 2.

In Figure 1 a cassette 11 is shown having a conventional front plate 12 made of Bakelite or other suitable material. A light-proof opening 13 adapted to receive an identification holder 14 is provided along an edge of the cassette 11 near one corner thereof.

The back of the cassette 11 is provided with conventional locking levers 15 and hinges 16 as shown in Figure 2 so as to provide access into the cassette for loading with film.

In Figure 2 the broken away portion reveals the position of the identification holder 14 when it has been inserted in the cassette through opening 13. As shown in Figure 3, the identification holder 14 comprises a folded sheet of transparent, relatively stiff material such as Celluloid or a transparent or translucent plastic material. A removable transparent slip 17 bearing identification data is inserted between the folds of the holder 14 before it is inserted in the cassette. The identification data can be placed on the slip 17 by means of any writing or printing ink such as typewriter ink, India ink, or modified India ink, the opacity of which has been intensified by the addition of a barium salt or the like. The slip 17 may be made of any desired transparent or translucent material such as regenerated cellulose, known as "cellophane," or the like.

As will be seen in Figure 4, the cassette comprises a hinged back plate 18 of metal or the like and the front plate 12. A resilient pad 19 of felt or the like and a fluorescent intensifying screen 20 are provided in the customary manner between the back 19 and the X-ray film 21. On the opposite side of the film 21, a second fluorescent intensifying screen 22 is provided. In the corner which receives the identification holder 14, the front plate 12 is recessed as at 23 and the corresponding corner of the intensifying screen 22 is cut out. A small intensifying screen 24 is provided to fit into the recess 23. This permits the holder 14 to be inserted between the film 21 and the small screen 24 as shown in Figure 4.

The opening 13 is formed by metal lips 25 and 26 which extend divergently from the edge of the cassette. Two felt pads 27 and 28 are secured to the inside surface of the metal lips to render the opening light-proof and to facilitate insertion and removal of the holder 14 from the cassette. To prevent the holder 14 from striking the edge of screen 24 and to guide the holder to the proper side of film 21, two guides 29 and 30 composed of Celluloid or other suitable material are provided as shown in the drawing.

Although the present invention has been described by reference to the specific embodiment shown in the drawings, it will be understood that various modifications which would be apparent to one skilled in the art are not excluded. Changes in materials may be made without departing from the spirit of the invention providing they serve the desired function and purpose. The use of a hinged door over the recess in addition to, or as a substitute for, the light-proof opening 13 is not excluded.

What is claimed is:

1. An X-ray cassette comprising a frame, a front plate provided with a recess in one corner thereof, an intensifying screen having a cut out portion corresponding with said recess, a small intensifying screen disposed within said recess, a photographic film overlying said intensifying screens, said frame being provided with an opening along one edge adjacent the recess, means for substantially preventing access of light into the casette through said opening, identification means insertable through said opening, guide members extending from a point inside the cassette adjacent said recess and between the film and said small intensifying screen to a point adjacent said opening for guiding said identification means into position between said film and said small intensifying screen.

2. An X-ray cassette as claimed in claim 1 wherein said identification means comprises a light transmitting holder and an identification slip contained within said holder.

3. An X-ray cassette as claimed in claim 2 wherein said holder has a length greater than the length of the recess so that a portion of said holder will project from the opening in the cassette after having been inserted therein.

4. An X-ray cassette as claimed in claim 2 wherein the holder and identification slip are composed of transparent material, said identification slip carrying indicia composed of an opaque material.

5. An X-ray cassette as claimed in claim 4 wherein the opaque indicia comprises an opaque ink.

6. An X-ray cassette as claimed in claim 5 wherein the ink comprises India ink containing an ingredient for intensifying the opacity thereof.

RACHEL M. F. MESCHAN.
ISADORE MESCHAN.

REFERENCES CITED

The following references are of record in the file of this patent:

UNITED STATES PATENTS

| Number | Name | Date |
|---|---|---|
| 2,077,500 | Townsend et al. | Apr. 20, 1937 |
| 2,332,375 | Files | Oct. 19, 1943 |
| 2,371,843 | Powers | Mar. 20, 1945 |
| 2,426,286 | Stadler | Aug. 26, 1947 |